US007495403B2

(12) United States Patent
Soudier et al.

(10) Patent No.: US 7,495,403 B2
(45) Date of Patent: Feb. 24, 2009

(54) METHOD, APPARATUS AND ARTICLE FOR VIBRATION COMPENSATION IN ELECTRIC DRIVETRAINS

(75) Inventors: Christophe Soudier, Ypsilanti, MI (US); Richard J. Hampo, Plymouth, MI (US); Vinod Reddy, Novi, MI (US); Venkatapathi R. Nallapa, West Bloomfield, MI (US)

(73) Assignee: Continental Automotive Systems US, Inc., Auburn Hills ( * ) Notice: Subject to any disclaimer, the term of this patent is extended or adjusted under 35 U.S.C. 154(b) by 633 days.

(21) Appl. No.: 11/095,035

(22) Filed: Mar. 30, 2005

(65) Prior Publication Data

US 2005/0253543 A1 Nov. 17, 2005

Related U.S. Application Data

(60) Provisional application No. 60/558,733, filed on Mar. 30, 2004.

(51) Int. Cl.
 *H02P 7/00* (2006.01)
(52) U.S. Cl. ..................................... 318/432; 318/632
(58) Field of Classification Search ................. 318/432, 318/632
 See application file for complete search history.

(56) References Cited

U.S. PATENT DOCUMENTS

| | | | |
|---|---|---|---|
| 4,042,869 A | 8/1977 | Eickelberg et al. | 318/630 |
| 4,507,595 A | 3/1985 | Rozsa | 318/630 |
| 4,513,231 A | 4/1985 | Kuno et al. | 318/341 |
| 4,958,636 A | 9/1990 | Blandino et al. | 128/630 |
| 5,008,605 A | 4/1991 | Ohara et al. | 318/630 |
| 5,012,417 A | 4/1991 | Watanabe et al. | 364/426.02 |
| 5,213,177 A | 5/1993 | May | 180/197 |
| 5,258,904 A * | 11/1993 | de Benito et al. | 363/41 |
| 5,442,268 A * | 8/1995 | Goodarzi et al. | 318/432 |
| 5,448,976 A | 9/1995 | Treinies et al. | 123/419 |
| 5,477,833 A | 12/1995 | Leighton | 123/497 |
| 5,498,945 A | 3/1996 | Prakash | 318/807 |
| 5,552,977 A | 9/1996 | Xu et al. | 363/41 |
| 5,610,483 A * | 3/1997 | Obara et al. | 318/139 |
| 5,627,446 A | 5/1997 | Deng et al. | 318/799 |
| 5,739,664 A | 4/1998 | Deng et al. | 318/808 |
| 5,759,133 A | 6/1998 | Treinies et al. | 477/110 |
| 5,796,236 A | 8/1998 | Royak | 318/804 |
| 5,821,720 A | 10/1998 | Deng et al. | 318/630 |
| 5,905,349 A | 5/1999 | Farkas et al. | 318/432 |
| 5,986,426 A | 11/1999 | Rowan | 318/599 |
| 5,994,859 A * | 11/1999 | Deng et al. | 318/432 |
| 6,047,787 A | 4/2000 | Deng et al. | 180/165 |
| 6,072,297 A | 6/2000 | Xu et al. | 318/630 |
| 6,122,588 A | 9/2000 | Shehan et al. | 701/93 |
| 6,212,085 B1 | 4/2001 | West | 363/132 |

(Continued)

FOREIGN PATENT DOCUMENTS

EP 0 651 158 A1 5/1995

(Continued)

*Primary Examiner*—Walter Benson
*Assistant Examiner*—Antony M Paul

(57) ABSTRACT

A torque current peak compensation value is subtracted from a torque current reference value, where the torque current peak compensation value is based at least in part on a determined peak of vibration. A torque current compensation value is subtracted from the results to produce an adjusted torque current reference value.

11 Claims, 7 Drawing Sheets

U.S. PATENT DOCUMENTS

| | | | |
|---|---|---|---|
| 6,239,575 B1 | 5/2001 | Xu et al. | 318/801 |
| 6,252,368 B1 * | 6/2001 | Sugie | 318/568.22 |
| 6,291,960 B1 | 9/2001 | Crombez | 318/599 |
| 6,327,524 B1 | 12/2001 | Chen | 701/22 |
| 6,366,049 B1 | 4/2002 | Chen et al. | 318/799 |
| 6,377,019 B1 | 4/2002 | Chen | 318/807 |
| 6,388,419 B1 | 5/2002 | Chen et al. | 318/727 |
| 6,452,352 B1 | 9/2002 | Farkas | 318/433 |
| 6,603,672 B1 | 8/2003 | Deng et al. | 363/37 |
| 6,630,809 B2 | 10/2003 | Chen et al. | 318/804 |
| 6,631,960 B2 | 10/2003 | Grand et al. | 303/152 |
| 6,700,342 B2 | 3/2004 | Hampo et al. | 318/432 |
| 6,707,270 B2 | 3/2004 | Chen et al. | 318/798 |
| 6,806,667 B1 * | 10/2004 | Sasaki et al. | 318/432 |
| 6,815,925 B2 | 11/2004 | Chen et al. | 318/727 |
| 6,843,749 B2 | 1/2005 | Kelledes et al. | 475/224 |
| 6,844,701 B2 | 1/2005 | Chen et al. | 318/825 |
| 6,845,020 B2 | 1/2005 | Deng et al. | 363/37 |
| 7,023,150 B2 * | 4/2006 | Hisada et al. | 318/34 |
| 2002/0060545 A1 * | 5/2002 | Inagaki et al. | 318/629 |
| 2003/0214266 A1 | 11/2003 | Cheng et al. | 318/716 |
| 2004/0036434 A1 | 2/2004 | Chen et al. | 318/432 |
| 2004/0062059 A1 | 4/2004 | Cheng et al. | 363/17 |

FOREIGN PATENT DOCUMENTS

| | | |
|---|---|---|
| JP | 3-261306 | 11/1991 |

* cited by examiner

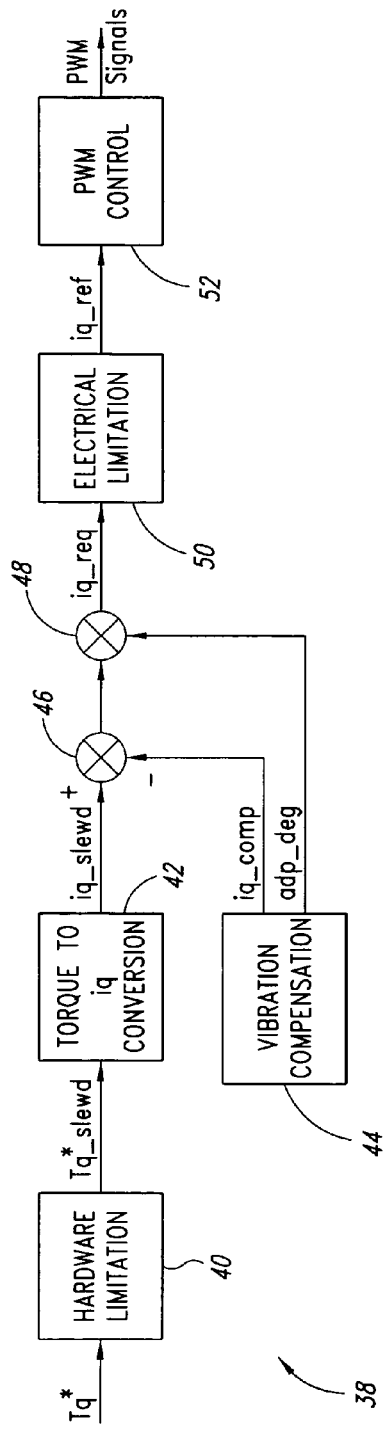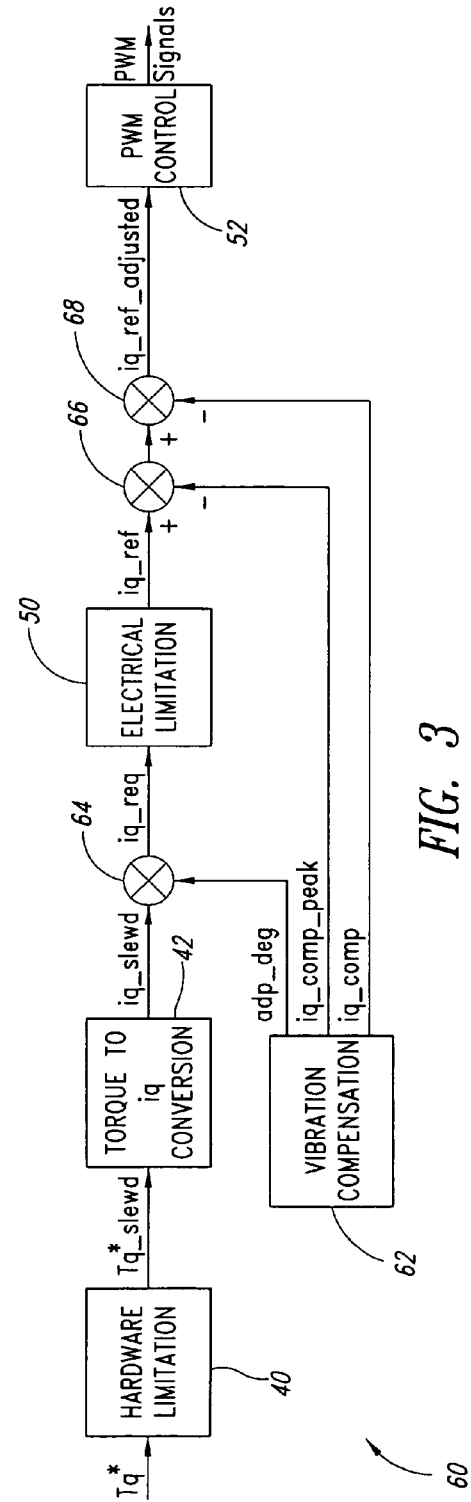

METHOD, APPARATUS AND ARTICLE FOR VIBRATION COMPENSATION IN ELECTRIC DRIVETRAINS

BACKGROUND OF THE INVENTION

1. Field of the Invention

The disclosure is generally related to electric drivetrains, and particularly to electric drivetrains comprising an alternating current (AC) electric motor powered by a direct current (DC) power source via one or more inverters.

2. Description of the Related Art

In contrast to an internal combustion engine, an electric motor can operate over a very wide range of rotational speeds. Thus, a multiple-speed transmission is not required in a vehicle propelled by an electric motor (e.g., electric vehicle or hybrid vehicle), as is the case for an internal combustion engine in order to convert the relatively narrow speed range of an internal combustion engine to a wider range of vehicle speeds. Consequently, electrically propelled vehicles may employ simple transmissions, for example, single-speed transmissions.

A simple transmission has several benefits, including reduced number of parts, reliability and low cost. However, simple transmissions may be subject to "backlash" where the mating teeth of two gears (e.g., a driving gear and a driven gear) are not in contact when the driving gear begins to move. When such a backlash condition occurs, the driving gear accelerates quickly before its teeth are in contact with the teeth of the driven gear. The result may produce a significant impact between the teeth of the gears, creating excess forces and consequently wear on the teeth of the gear. The impact may also introduce a significant torsional oscillation into the vehicle's drivetrain, particularly around the torsional resonant frequency of the drivetrain. The oscillation in turn may lead to customer dissatisfaction with the drivability of the vehicle.

Some electric vehicles employ vibration compensators to overcome the torsional vibration caused by gear backlash and chassis dynamic. Such vibration compensators typically employ a band pass filter operating on a speed signal and centered on the natural resonance frequency of the drive or power train. The output of the filter is proportional to the degree of vibration, and is subtracted from the requested torque command to compensate for the vibration.

Such vibration compensators are inadequate in a number of different circumstances, for example, where available power or ability to produce additional torque are limited. A system that can provide vibration compensation over a wider range of conditions may advantageously increase reliability and/or improve customer satisfaction.

BRIEF SUMMARY OF THE INVENTION

In one embodiment, a peak level detector determines a peak of vibration, and a corresponding compensation value which is subtracted from a limited commanded torque current request. The normal output of the compensator is then subtracted from the resulting value to allow the compensator to reduce or eliminate vibration.

In one embodiment, a method of vibration compensation comprises: applying a hardware limitation to a torque command to produce a torque request; converting the torque request to a torque current value; determining a peak of vibration; applying an adaptation degree value to the torque current value to produce a torque current request value wherein the adaptation degree value is based at least in part on the determined peak of vibration; applying an electrical limitation to the torque current request value to produce a torque current reference value; subtracting a torque current peak compensation value from the torque current reference value, wherein the torque current peak compensation value is based at least in part on the determined peak of vibration; subtracting a torque current compensation value from the results of the subtraction of the torque current compensation value from the torque current reference value to produce an adjusted torque current reference value; pulse width modulating the adjusted torque current reference value to produce pulse width modulated signals; and providing the pulse width modulated signals to drive a power converter.

In one embodiment, determining a peak of vibration comprises: setting a torque current compensation maximum value equal to the torque current compensation value if the torque current compensation value is greater than the torque current compensation maximum value; and setting a torque current compensation minimum value equal to the torque current compensation value if the torque current compensation value is less than the torque current compensation minimum value. In one embodiment, determining a peak of vibration further comprises: if the torque current compensation value is not greater than the torque current compensation maximum value and if the torque current compensation value is not less than the torque current compensation minimum value, setting the torque current compensation maximum value equal to the product of the torque current compensation value and a multiplicand between zero and one; and setting the torque current compensation minimum value equal to the torque current compensation value if the torque current compensation value is less than the torque current compensation minimum value. In one embodiment, determining a peak of vibration further comprises: determining if a compensation function is disabled; and if the compensation function is disabled, setting the torque current compensation maximum value equal to zero; and setting the torque current compensation minimum value equal to zero.

In one embodiment, the method further comprises: setting a present peak value equal to an absolute value of a present torque current compensation value if the present torque current compensation value is greater than a previous peak value. In one embodiment, the method further comprises: setting the present peak value equal to a summation of the previous peak value minus a product of a constant and the previous peak value wherein the constant is between zero and one. In one embodiment, the constant is approximately 0.995.

In one embodiment, a system for controlling an alternating current machine comprises: a torque to current conversion module configured to generate a torque current signal in response to a torque command signal; a pulse width modulation module configured to receive a reference signal and to produce a pulse width modulated signal; and a vibration compensation module configured to generate a torque current compensation signal and an adaptation degree signal based at least in part on a vibration signal, wherein the system is configured to produce the reference signal based at least in part on the torque current signal, the torque current compensation signal and the adaptation degree signal.

In one embodiment, the system further comprises: a summer configured to subtract the torque current compensation signal from the torque current signal and to produce a summer output signal; and a multiplier configured to multiply the summer output signal by the adaptation degree signal and to produce a multiplier output signal. In one embodiment, the system further comprises an electrical limitation module coupled between the multiplier and the pulse width modulation module and configured to receive the multiplier output signal and to produce the reference signal. In one embodiment, the system further comprises a hardware limitation module coupled to the torque to current conversion module and configured to produce the torque command signal.

In one embodiment, the vibration compensation module is further configured to generate a torque current peak compensation signal and the system is further configured to generate the reference signal based at least in part on the torque current peak compensation signal. In one embodiment, the system further comprises: a multiplier configured to multiply the torque current signal by the adaptation degree signal and to produce a multiplier output signal; an electrical limitation module configured to receive the multiplier output signal and to produce an electrical limitation output signal; a first summer configured to subtract the torque current peak compensation signal from the electrical limitation output signal and to produce a first summer output signal; and a second summer configured to subtract the torque current compensation signal from the first summer output signal and to produce the reference signal.

In one embodiment, a method of vibration compensation comprises: converting a torque request to a torque current signal; generating a torque current compensation signal and an adaptation degree signal based at least in part on a vibration signal; and adjusting the torque current signal based at least in part on the torque current compensation signal and the adaptation degree signal.

In one embodiment, the method further comprises: applying an electrical limitation to the adjusted torque current signal; and generating a pulse width modulation signal based at least in part of the limited adjusted torque current signal. In one embodiment, the method further comprises generating a torque current peak compensation signal, wherein adjusting the torque current signal comprises adjusting the torque current signal based at least in part on the torque current peak compensation signal.

In one embodiment, a system for controlling an alternating current machine comprises: means for converting a torque request to a torque current signal; means for generating control signals based at least in part on a vibration signal; means for adjusting the torque current signal coupled to the means for generating control signals and the means for converting a torque request to a torque current signal; and means for generating a pulse width modulated signal coupled to the means for adjusting the torque current signal.

In one embodiment, the means for adjusting the torque current signal comprises means for applying an electrical limitation and the means for generating control signals is configured to generate a torque current compensation signal and an adaptation degree signal, wherein the means for adjusting the torque current signal is configured to: subtract the torque current compensation signal from the torque current signal, generating a first adjusted signal; multiply the first result by the adaptation degree signal, generating a second adjusted signal; and apply the electrical limitation to the second adjusted signal.

In one embodiment, the means for adjusting the torque current signal comprises means for applying an electrical limitation and the means for generating control signals is configured to generate a torque current compensation signal, an adaptation degree signal, and a torque current peak compensation signal, wherein the means for adjusting the torque current signal is configured to: multiply the torque current signal by the adaptation degree signal, generating a first adjusted signal; apply the electrical limitation to the first adjusted signal, producing a second adjusted signal; subtract the torque current peak compensation signal from the second adjusted signal, producing a third adjusted signal; and subtract the torque current compensation signal from the third adjusted signal.

In one embodiment, a computer-readable memory medium stores instructions for causing a control system to facilitate vibration compensation by: determining a vibration value; generating an adaptation degree value based at least in part on the vibration value; generating a torque current compensation value based at least in part on the vibration value; and adjusting a torque current reference value based on the adaptation degree value and the torque current compensation value.

In one embodiment, the stored instructions further comprise instructions for causing the control system to facilitate vibration compensation by: generating a torque current peak compensation value; and adjusting the torque current reference value based on the torque current peak compensation value.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 2 is a high-level control diagram illustrating a method of controlling the inverter employing vibration compensation according to one illustrated embodiment.

FIG. 3 is a high-level control diagram illustrating a method of controlling the inverter employing vibration compensation according to another illustrated embodiment.

DETAILED DESCRIPTION OF THE INVENTION

In the following description, certain specific details are set forth in order to provide a thorough understanding of various embodiments of the present methods, apparatus and articles. However, one skilled in the art will understand that the present methods, apparatus and articles may be practiced without these details. In other instances, well-known structures associated with power converters, switched mode power converters, controllers, electric and/or hybrid vehicles, motors, drivetrains, batteries and/or ultracapacitors have not been shown or described in detail to avoid unnecessarily obscuring descriptions of the embodiments of the present methods, apparatus and articles.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the present methods, apparatus and articles. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

Figure 1:
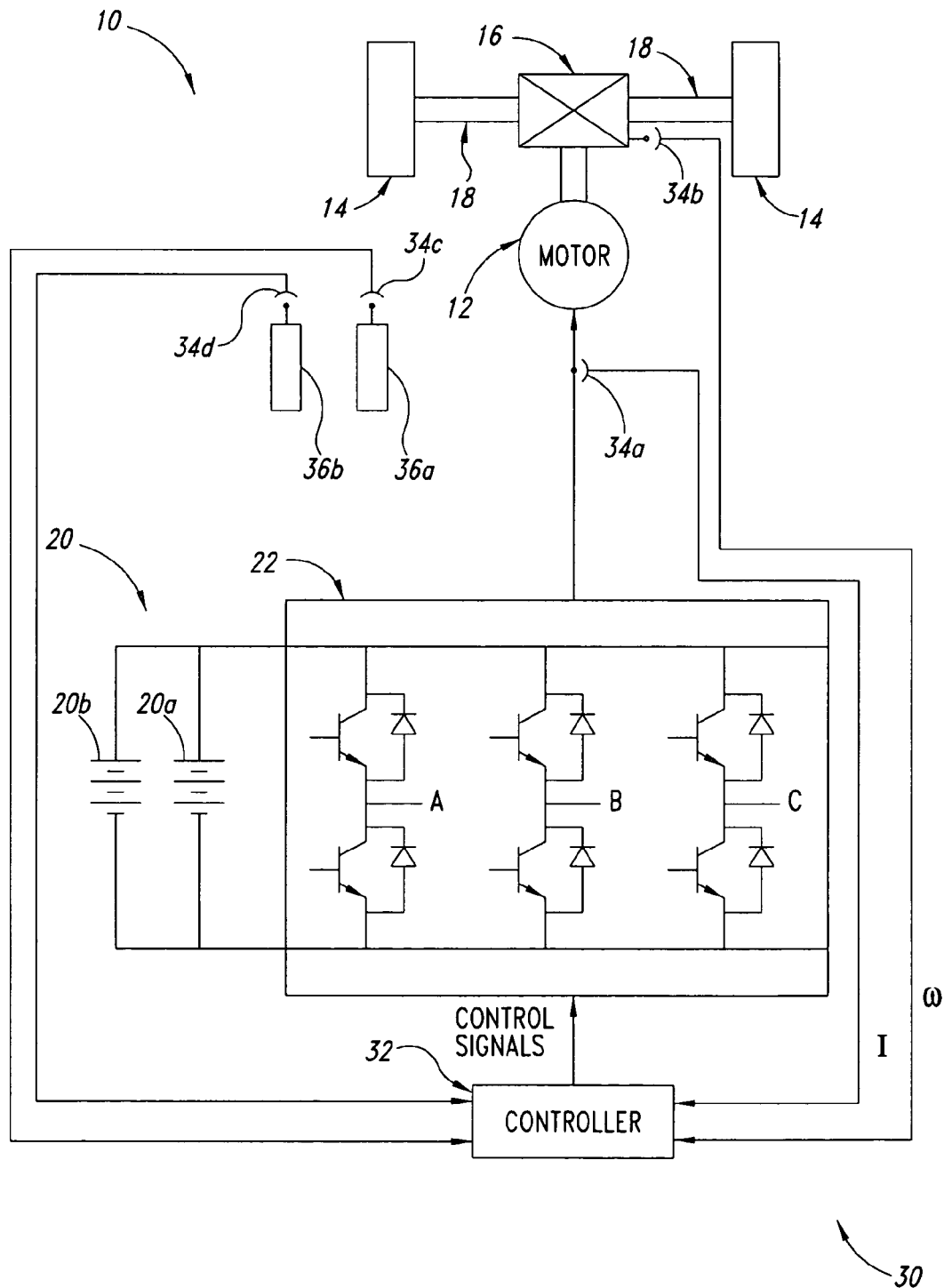
FIG. 1 is a schematic diagram of an electric vehicle including an electric motor, a DC power source, an inverter coupled to invert DC power from the DC power source and to supply AC power to the electric motor, and a motor controller according to at least one illustrated embodiment.

FIG. 1 shows a vehicle 10 such as an electric vehicle comprising an electric motor 12 physically coupled to drive at least one wheel 14 of the vehicle 10 by way of at least one transaxle 16 and at least one axle 18. The electric motor 12 may take a variety of forms, for example, an AC electric motor such as a three-phase AC electric motor. The electric motor 12, transaxle 15, axle 18 may take the form of an integrated drive or power train.

The vehicle 10 also comprises one or more DC power sources 20. The DC power source 20 may, for example, take the form of one or more DC power storage devices 20a, such as one or more batteries and/or ultracapacitors capable of selectively storing and releasing electrical energy. The DC power source 20 may additionally, or alternatively, take the form of one or more DC power generation devices 20b such as such as one or more fuel cells capable of consuming a replaceable fuel to produce electrical energy.

The vehicle 10 further comprises a power converter 22 coupled between the DC power source 20 and the electric motor 12. The power converter 22 may form a portion of the integrated drive or power train.

The power converter 22 comprises a number of switches, for example insulated gate bipolar transistors (IGBTs) and/or metal oxide semiconductor field effect transistors (MOSFETs), configured and operable as an inverter to transform DC power from the DC power source 20 to AC power which is supplied to the electric motor 12. In particular, the power converter 22 may be operated as a three-phase AC inverter providing a respective phase of the output at phase terminals A, B, C. In some embodiments the power converter 22 is also operable as a rectifier to rectify AC power from the electric motor 12 operated as a generator, or other source, to recharge the power source 20, for example, via regenerative braking techniques.

The vehicle 10 may take the form of a hybrid electric vehicle further comprising a generator (not shown), an internal combustion engine (not shown), and optionally a dedicated rectifier (not shown). The internal combustion engine may be physically coupled to drive the generator to produce AC power. The generator may be coupled to supply the AC power to the DC power storage device 20a via the rectifier or via the power converter 22 when operated as a rectifier, for recharging the DC power storage device 20a.

The vehicle 10 further comprises a control system 30 comprising a controller 32 and optionally, one or more sensors (only four are illustrated) 34a-34d coupled to provide operational information or data to the controller 32 or to another controller (not shown) communicatively coupled to the controller 32.

The controller 32 will typically take the form of one or more programmed or programmable microprocessors with, or without, associated memory; digital signal processors (DSP), application specific integrated circuits (ASIC); however the controller 32 may additionally or alternatively comprise discrete circuitry as suits the specific application. The controller 32 is coupled to provide control signals to operate the power converter 22.

The sensors 34a-34d are positioned and/or configured to capture operational data for various components of the vehicle 10. For example, one or more sensors 34a may detect current supplied by the power converter 22 to the electric motor 12. Another sensor 34b may detect angular velocity of the transaxle 16 and/or axle 18. A further sensor 34c may detect a position of an actuator such as a throttle, for example, in the form of an acceleration pedal 36a. Another sensor 34d may detect a position of an actuator such as brake pedal 36b.

FIG. 2 shows a high-level control regime 38 employing peak detection according to one illustrated embodiment, which may be executed by a controller such as the controller 32 of FIG. 1.

In particular, a torque command $T_q^*$ is received indicating a desired amount of torque. The torque command $T_q^*$ may be based at least in part on the position of the throttle or accelerator pedal 36a, position of the brake pedal 36b, and/or other actuator or component of the electric vehicle 10.

A hardware limitation function or module 40 applies a hardware limitation to the torque command $T_q^*$ to produce a hardware limited torque command $T_q^*{}_{\_slewd}$. The hardware limitation reduces the torque command $T_q^*$ in certain situations, typically in order to protect the system or system components from possible damage. For example, the hardware limitation may be related to an over-temperature condition of one or more switches in the power converter 22. The hardware limitation may additionally, or alternatively, be related to an over-temperature condition of the electric motor 12. The hardware limitation may additionally, or alternatively be related to an over-speed condition of the transaxle 16 and/or axle 18. The hardware limitation may additionally, or alternatively, be related to a loss of oil pressure in the integrated drive or power train or some portion thereof.

A torque to torque current converter function or module 42 converts the hardware limited torque command $T_q^*{}_{\_slewd}$ to a torque current value $i_{q\_slewd}$.

A vibration compensation function or module 44 determines a torque current compensation value $i_{q\_comp}$ and an adaptation degree value adp_deg discussed in more detail with reference to FIG. 4, below.

A summer 46 subtracts the torque current compensation value $i_{q\_comp}$ from the torque current value $i_{q\_slewd}$, and a multiplier 48 multiplies the resulting sum by the adaptation degree value adp_deg to produce a torque current request $i_{q\_req}$.

An electrical limitation function or module 50 applies an electrical limitation to the torque current request $i_{q\_req}$ to produce a torque current reference $i_{q\_ref}$. For example, the electrical limitation may be related to maintaining the current through windings in the electric motor 12 below some defined maximum limit $i_{q\_max}$. The electrical limitation may additionally, or alternatively, be related to maintaining the voltage and/or current draw on the power source (e.g., battery or ultracapacitor 20a, fuel cell stack 20b) below or within defined limits. For example, maintaining the voltage and/or current draw on the battery below the defined limits $v_{bat\_max}$, $i_{bat\_max}$ in regeneration mode, or maintaining the current draw on the battery below a defined limit $i_{bat\_max}$ in drive mode. The electrical limitation may additionally, or alternatively, be related to limiting slip, for example, when accelerating from a stop, as more fully discussed in commonly assigned U.S. Pat. No. 6,377,019, issued Apr. 23, 2002 to Chen, and entitled "PEAK TORQUE PER AMPERE METHOD FOR INDUCTION MOTOR VECTOR CONTROL", and in U.S. Pat. No. 5,796,236, issued Aug. 8, 1998, to Royak, entitled "SLIP ADJUSTER FOR USE IN ELECTRICAL MOTOR CONTROLLERS" and assigned to Reliance Electric Industrial Company. The electrical limitation may additionally, or alternatively be related to a saturation state level of the electric motor 12, as generally described in commonly assigned U.S. Pat. No. 6,630,809 issued Oct. 7, 2003 to Chen et al., and entitled "SYSTEM AND METHOD FOR INDUCTION MOTOR CONTROL."

Pulse width modulation function or module 52 pulse width modulates the torque current reference $i_{q\_ref}$ to produce pulse width modulated (PWM) signals. The PWM signals are provided to the power converter 22 for driving the switches of the power converter 22 accordingly as an inverter to produce the desired AC output for driving the electric motor 12.

The torque current compensation value $i_{q\_comp}$ may be either positive or negative. Thus, the torque current compensation value $i_{q\_comp}$ may push the torque current request $i_{q\_req}$, and hence torque current reference $i_{q\_ref}$ out of range, particularly where the torque current value $i_{q\_slewd}$ is at the operational limits of the system. An apparatus and method that also addresses this problem is thus desirable.

FIG. 3 shows a high-level control regime 60 employing peak detection that address the above noted problem. The high-level control regime 60 may be executed by the controller 32, according to one illustrated embodiment.

In a similar fashion to that of FIG. 2, the torque command $T_q^*$ is received indicating a desired torque, and is hardware limited to produce the hardware limited torque command $T_q^*\_{slewd}$. The hardware limited torque command $T_q^*\_{slewd}$ is converted to a torque current value $i_{q\_slewd}$.

In contrast to the embodiment of FIG. 2, the vibration compensation function or module 62 employs a peak detection function to provide a torque current peak compensation value $i_{q\_comp\_peak}$, in addition to the torque current compensation value $i_{q\_comp}$ and the adaptation degree value adp_deg.

In a first embodiment, the peak detection function is performed as part of the vibration compensation function 62 according to the following algorithm:

if $|i_{q\_comp}(n)|$>peak($n-1$) then peak($n$)=$|i_{q\_comp}(n)|$ else peak($n$)=peak($n-1$)-$K$*peak($n-1$), where n is an integer value representing successive samples; and where K is a constant with the property 0<K<1, to smoothly decrease the peak value.

Thus, in the first embodiment the peak detection function sets the present peak value equal to the absolute value of the present torque current compensation value $i_{q\_comp}$ where the absolute value of the present torque current compensation value $i_{q\_comp}$ is greater than the previous peak value. Otherwise the peak detection function sets the present peak value equal to the previous peak value minus a percentage of the previous peak value, where the percentage is defined by the constant K. The constant K sets the slope of the function.

Since the absolute value of the torque current compensation value $i_{q\_comp}$ is used in the above approach, there is a decrease in the torque current reference $i_{q\_ref}$ if there is a big negative peak in the torque current compensation value $i_{q\_comp}$, whereas there is no impact with respect to battery limitation. In at least some embodiments, it may be desirable to have the peak detection function work for both for a positive peak if the torque current reference $i_{q\_ref}$ is a positive value, and for a negative peak if the torque current reference $i_{q\_ref}$ is negative value. A second embodiment of the peak detection function achieves this by calculating separate values, maximum torque current compensation value $i_{q\_comp\_max}$ and minimum torque current compensation value $i_{q\_comp\_min}$ for positive and negative compensation, respectively, where the torque current reference $i_{q\_ref}$ is given by equation 1, below.

$$i_{q\_ref} = i_{q\_battery\_limited} - [(i_{q\_ref}>0)*i_{q\_comp\_max} + (i_{q\_ref}<0)*i_{q\_comp\_min}] + i_{q\_comp} \quad \text{Equation 1}$$

The second embodiment of the peak detection function may be performed as part of the vibration compensation function or module 62, according to the following algorithm:

```
if (dis__antishudder) then
    i_q_comp_max = 0
    i_q_comp_min = 0
else if (i_q_comp > i_q_comp_max) then
    i_q_comp_max = i_q_comp
else if (i_q_comp < i_q_comp_min) then
    i_q_comp_min = i_q_comp
else
    ulong_union.all =
    lib__math__mullui(i_q_comp_max, (uint)65206);
    i_q_comp_max = ulong__union.part.msuint;
    ulong__union.all =
    lib__math__mullui(-i_q_comp_min, (uint)65206);
    i_q_comp_min = -(int)ulong__union.part.msuint;
end if
```

Thus in the second embodiment, the peak detection function employs two separate compensation values, a maximum torque current compensation value $i_{q\_comp\_max}$ and a minimum torque current compensation value $i_{q\_comp\_min}$. The peak detection function sets both the maximum torque current compensation value $i_{q\_comp\_max}$ and the minimum torque current compensation value $i_{q\_comp\_min}$ to zero if the vibration compensation (ie., dis_antishudder flag) is disabled.

If the vibration compensation is not disabled, the peak detection function sets the maximum torque current compensation value $i_{q\_comp\_max}$ equal to the torque current compensation value $i_{q\_comp}$ if the torque current compensation value $i_{q\_comp}$ is greater than the maximum torque current compensation value $i_{q\_comp\_max}$, or sets the minimum torque current compensation value $i_{q\_comp\_min}$ equal to the torque current compensation value $i_{q\_comp}$ if the torque current compensation value $i_{q\_comp}$ is less than the minimum torque current compensation value $i_{q\_comp\_min}$.

If none of the above conditions are true, the vibration is slowly disappearing so the speed may be gradually reduced or decayed. The reduction in speed is implemented using a decay value which is between zero and one. In particular, a mathematical function is called from a library (i.e., lib_math_mullui) two times. The lib_math_mullui function is simply a function that performs a multiplication of unsigned integers. In the first instance, the mathematical function multiplies the maximum torque current compensation value $i_{q\_comp}$ max by the decay value. In the second instance, the mathematical function multiplies the minimum torque current compensation value $i_{q\_comp\_min}$ by the decay value. The results are stored to a 32-bit register (i.e., ulong_union.all).

In the above example, the decay value is equal to the quotient of two 16-bit numbers (i.e., quotient of the 16-bit integer 65206 divided by the 16-bit integer 65536). The division is performed implicitly by taking the upper 16 bits of a 32-bit register. In particular, the line following the multiplication (lib_math_mullui) takes the 16 most significant bits of the result of the multiplication, to perform the implicit division function. The 4 lines of the "else" portion of the algorithm simply scale the $i_{q\_comp\_max}$ and $i_{q\_comp\_min}$ values.

In further contrast to the embodiment of FIG. 2, a multiplier 64 initially multiplies the torque current value $I_{q\_slewd}$ by the adaptation degree value adp_deg. The electrical limitation function or module 50 then applies the electrical limitation to the resulting torque current request $i_{q\_req}$ to produce the torque current reference $i_{q_{comp}\_ref}$. A first summer 66 subtracts the torque current peak compensation value $i_{q\_comp\_peak}$ from the torque current reference $i_{q\_ref}$ and a second summer 68 subtracts the torque current compensation value $i_{q\_comp}$ from the resulting sum to produce an adjusted torque current reference $i_{q\_ref\_adjusted}$. The adjusted torque current reference $i_{q\_ref\_adjusted}$ is pulse width modulated to produce PWM signals for driving the switches of the power converter 22 accordingly operated as an inverter to produce the desired AC output for driving the electric motor 12.

Figure 4:
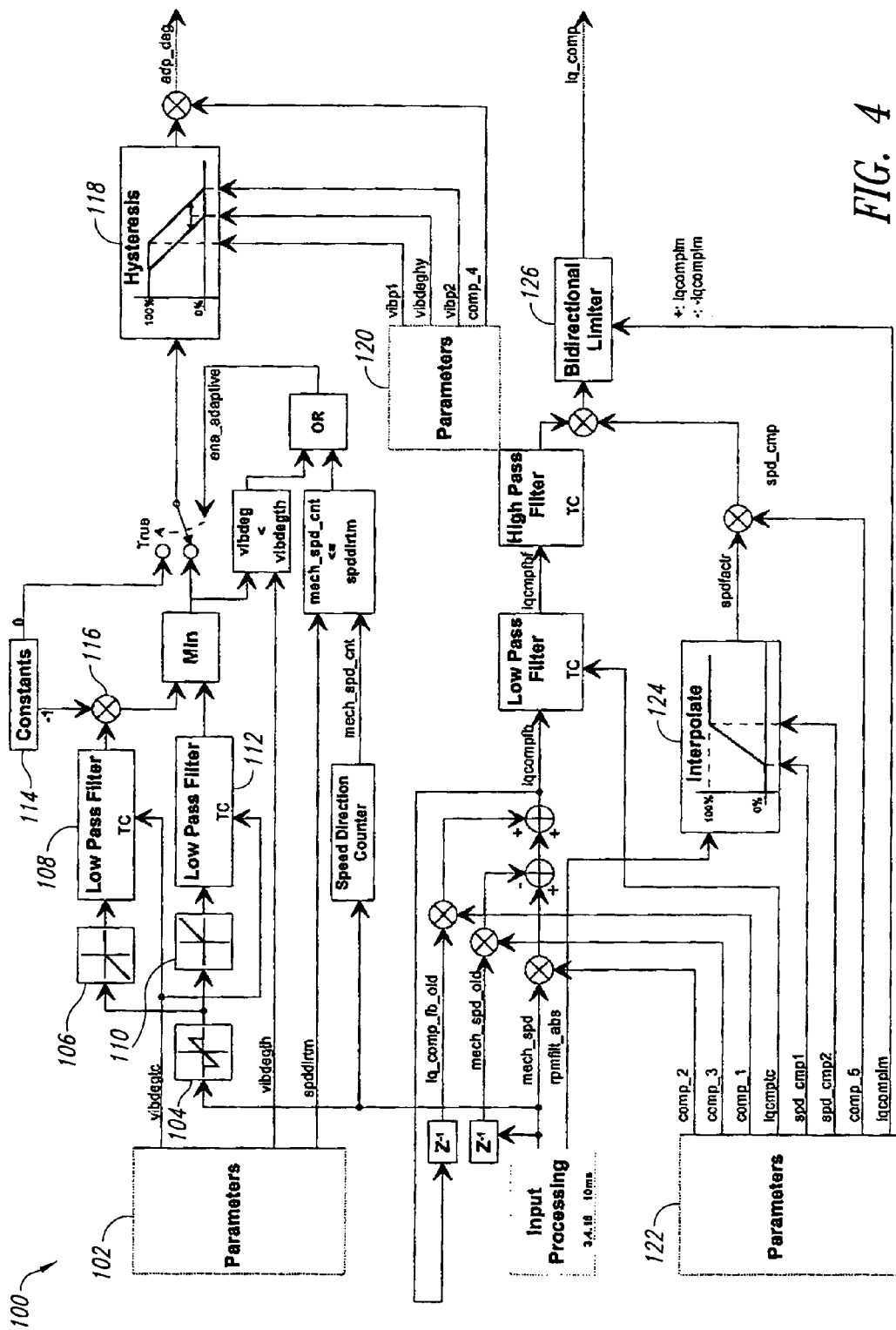
FIG. 4 is a mid-level control diagram of a vibration compensation function that provides values adaptation degree, adp_deg, and torque current compensation, $i_{q\_comp}$.

FIG. 4 shows a vibration compensation function or module 100, according to one illustrated embodiment.

A first set of parameters 102 is provided from a variety of sensors and or actuators (not shown). A first limiter function or module 104 limits the range of the mechanical speed parameter mech_spd. A second limiter function or module 106 takes the negative values, zeroing out the positive values, and supplies the results to a first low pass filter 108. A third limiter function or module 110 takes the positive values, zeroing out the negative values, and supplying the results to a second low pass filter 112. Constants 114 are applied via a summer junction 116, and a hysteresis function or module 118 is applied based on a second set of parameters 120, to produce the adaptation degree value adp_deg.

A third set of parameters 122 is provided from a variety of sensors and or actuators (not shown). An interpolation function or module 124 interpolates a number of these parameters, which are limited by a bidirectional limiter function or module 126 to produce the torque current compensation value $i_{q\_comp}$.

Figure 5:
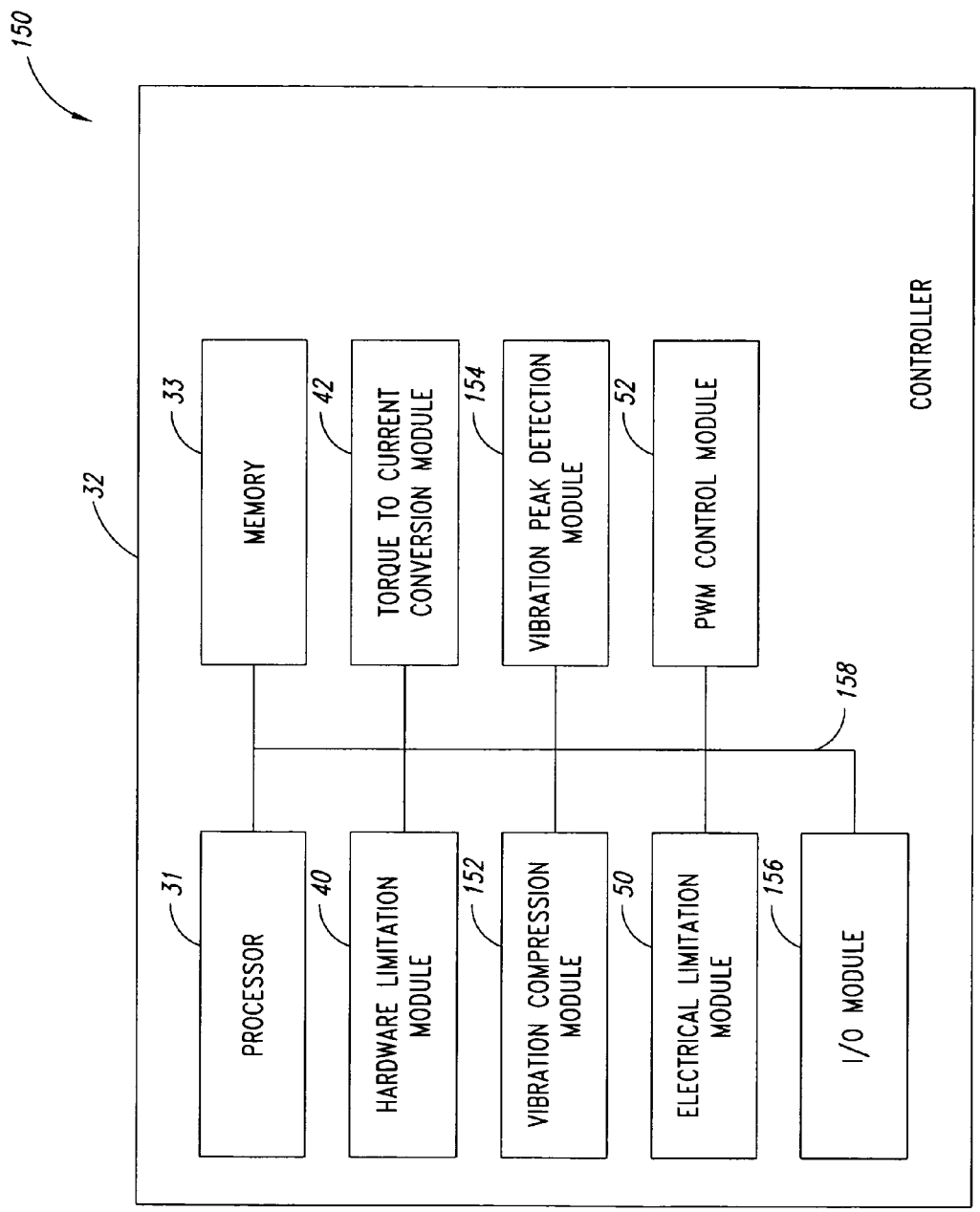
FIG. 5 is a functional block diagram of an embodiment of a system employing vibration control with vibration detection.

FIG. 5 shows a functional block diagram of an embodiment of system 150 employing vibration control with vibration detection. The system 150 comprises a controller 32. In the embodiment illustrated in FIG. 5, the controller 32 comprises a processor 31, a memory 33, a hardware limitation module 40, a torque to current conversion module 42, a vibration compensation module 152, a vibration detection module 154, an electrical limitation module 50, a PWM control module 52, an I/O module 156 and a controller system bus 158. The control system bus 158 may comprise a power bus, control bus, and status signal bus in addition to a data bus. For the sake of clarity, however, the various control system buses are illustrated in FIG. 5 as the controller system bus 158.

The controller 32 may be implemented in a variety of ways, including as separate subsystems. The controller 32 may be implemented as a microprocessor, a digital signal processor (DSP), an application-specific integrated circuit (ASIC), a gate-driver board, or the like, or as a series of instructions stored in a memory, such as the memory 33 and executed by a processor, such as the processor 31, or various combinations of the above. Thus, software modifications to existing hardware may allow the implementation of the controller 32. Various modules, such as the vibration detection module 154, are identified as separate blocks in the functional block diagram of FIG. 5 because they perform specific functions that will be described in more detail below. These modules may not be discrete units but may be functions of a software routine, which will probably, but not necessarily, be separately callable and hence identifiable elements. The various modules may be combined. For example, all or portions of the vibration detection module 154 may be integrated into the vibration compensation module 152.

While the illustrated embodiment denotes a single processor 31, other embodiments may comprise multiple processors. The memory 33 may comprise, for example, registers, read only memory ("ROM"), random access memory ("RAM"), flash memory and/or electronically erasable programmable read only memory ("EEPROM"), and may provide instructions and data for use by the controller 32.

The hardware limitation module 40 applies a hardware limitation to a torque command to produce a hardware limited torque command. The hardware limitation reduces the torque command in certain situations, typically in order to protect the system or system components from possible damage. The torque to torque current conversion module 42 converts the hardware limited torque command to a torque current value. The vibration compensation module 152 receives a vibration signal from the vibration detection module 154 and generates signals for use in vibration compensation. In some embodiments, the vibration compensation module 154 determines a torque current compensation value and an adaptation degree value. See, for example, vibration compensation module 44 discussed above with reference to FIG. 2 and vibration compensation module 100 discussed above with reference to FIG. 4. In other embodiments, the vibration compensation module 154 determines a torque current compensation value, an adaptation degree value and a torque current peak compensation value, as discussed above with reference to FIG. 3.

The electrical limitation module 50 applies an electrical limitation to the torque current request to produce a torque current reference. The pulse width modulation module 52 pulse width modulates the torque current reference to produce pulse width modulated (PWM) signals. The I/O module facilitates reception and transmission of signals, such as data and control signals, by the controller 32.

Figure 6:
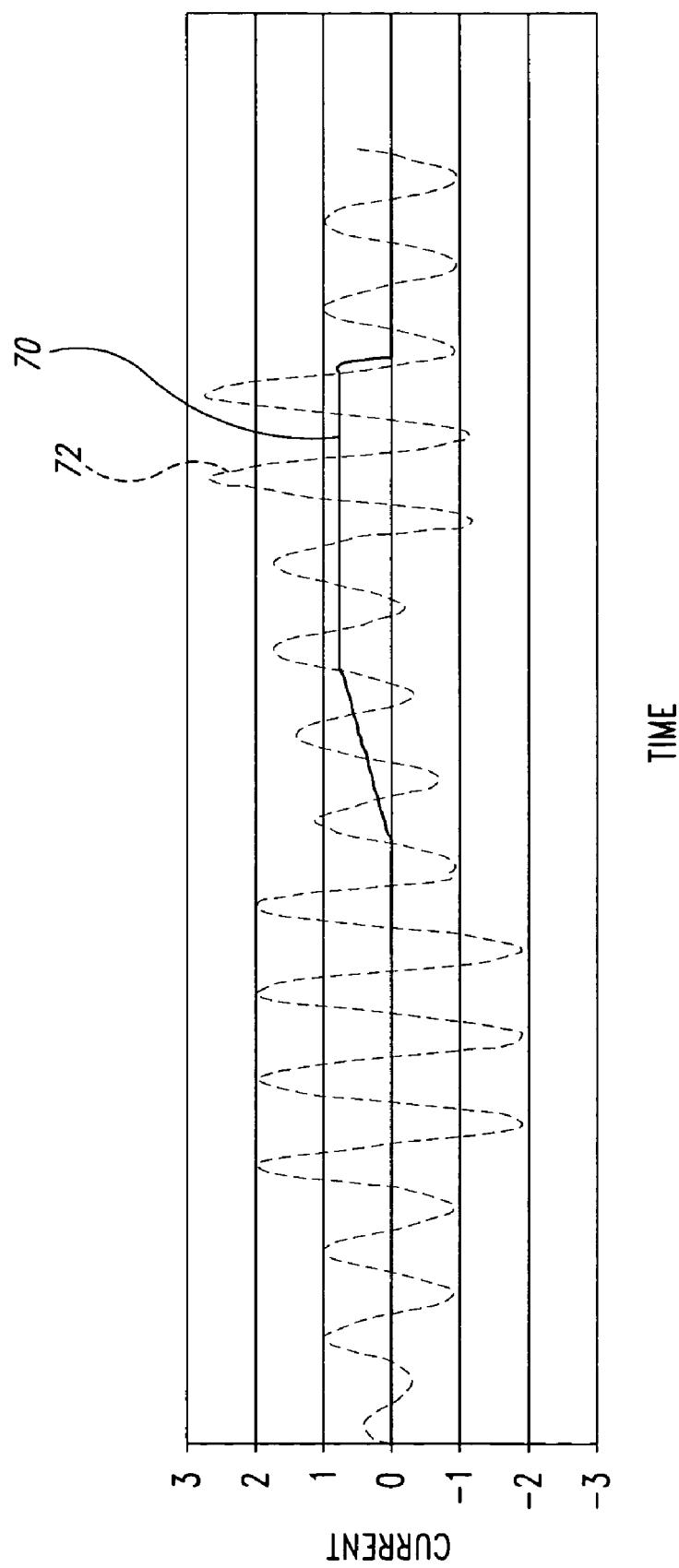
FIG. 6 is a graph of current versus time.

FIG. 6 shows a graph of current versus time for a torque current reference 70 (i.e., $i_{q\_ref}$) and a torque current reference with vibration compensation 72 ($i_{q\_ref}+i_{q\_comp}$), according to one illustrated embodiment.

Figure 7:
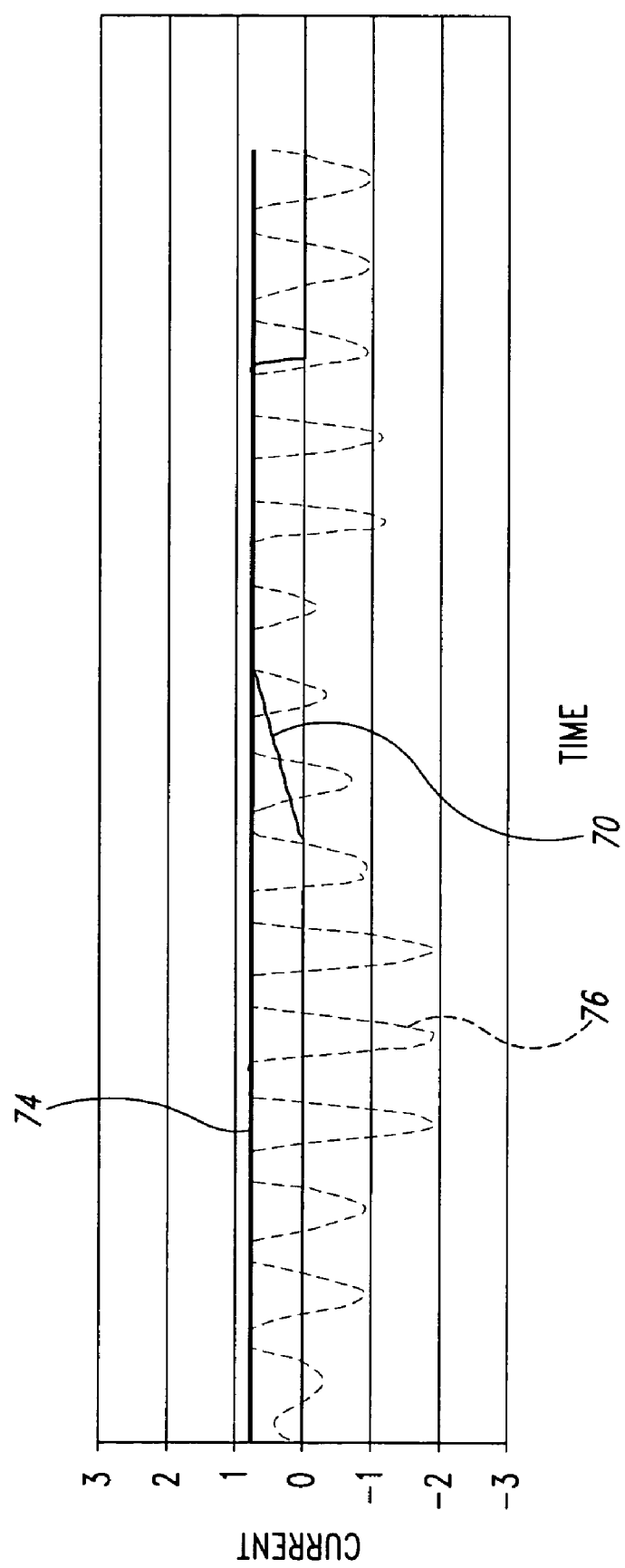
FIG. 7 is a graph of current versus time.

FIG. 7 shows a graph of current versus time for the torque current reference 70 (i.e., $i_{q\_ref}$), a torque current limitation 74, and a torque current reference with vibration compensation with limitation 76 ($i_{q\_ref}+i_{q\_comp}$), according to another illustrated embodiment.

Figure 8:
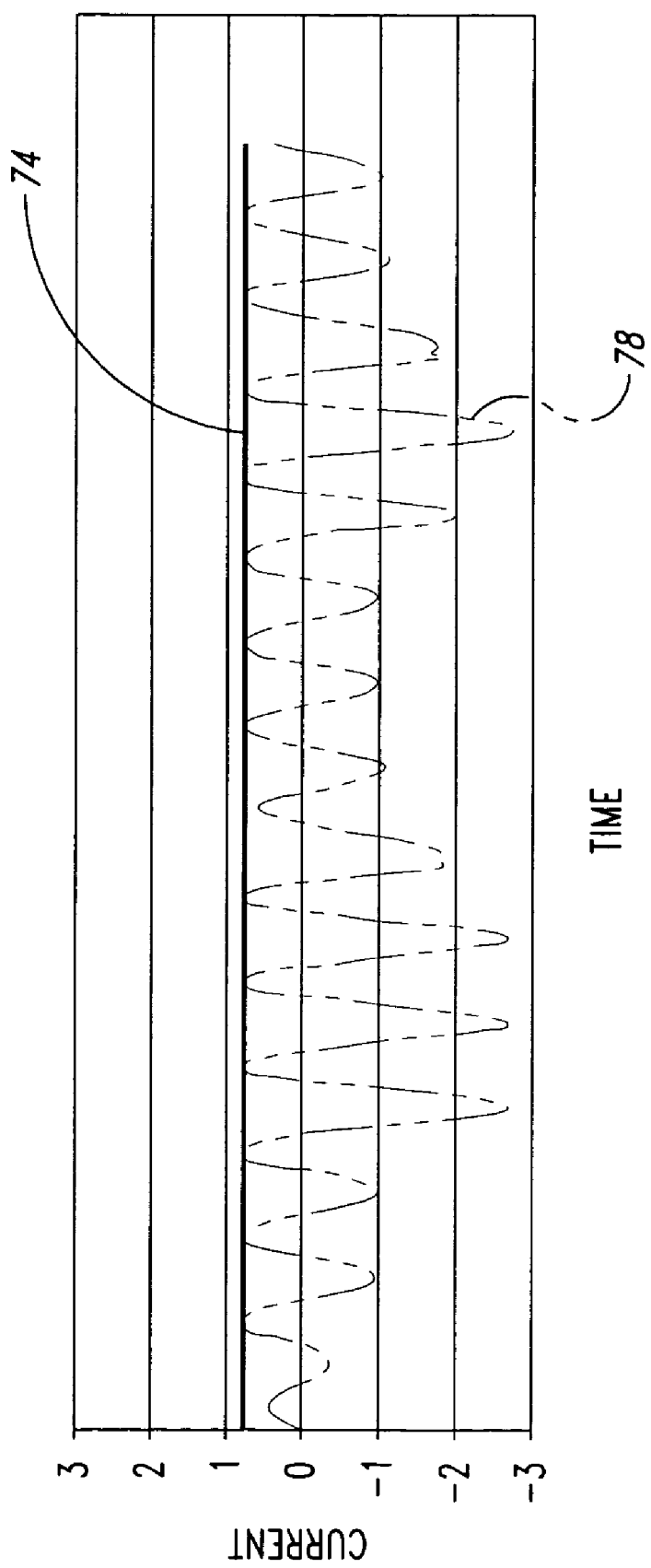
FIG. 8 is a graph of current versus time.

FIG. 8 shows a graph of current versus time for the torque current reference $i_{q\_ref}$ (not shown in FIG. 8), the torque current limitation 74, and a torque current request with vibration compensation after optimization for limitation 78 ($i_{q\_ref}+$ optimized$+i_{q\_comp}$), according to a further illustrated embodiment.

Those skilled in the relevant art can readily create source code based on FIGS. 2-5 and the detailed description provided herein.

The term "computer-readable medium" as used herein refers to any medium that participates in providing instructions to a system or a processor for execution. Such a medium may take many forms, including but not limited to, nonvolatile media, volatile media, and transmission media. Nonvolatile media includes, for example, hard, optical or magnetic disks. Volatile media includes dynamic memory. Transmission media includes coaxial cables, copper wire and fiber optics. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM and an EEPROM, a FLASH-EPROM, any other memory chip or cartridge, a carrier wave, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to computer system can receive the data on the telephone line and use an infrared transmitter to convert the data to an infrared signal. An infrared detector coupled to a system bus can receive the data carried in the infrared signal and place the data on system bus. The system bus carries the data to system memory, from which a processor retrieves and executes the instructions. The instructions received by system memory may optionally be stored on storage device either before or after execution by the processor.

Although specific embodiments of and examples for the methods, apparatus and articles for vibration compensation are described herein for illustrative purposes, various equivalent modifications can be made without departing from the spirit and scope of the invention, as will be recognized by those skilled in the relevant art. The teachings provided herein of the present methods, apparatus and articles can be applied to other systems, not necessarily the exemplary single controller system electric vehicle based system generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to patents U.S. Pat. No. 5,498,945, issued Mar. 12, 1996, to Prakash, and entitled "PEAK TORQUE-PER-AMPERE (PTPA) CONTROL METHOD FOR AN INDUCTION MOTOR"; U.S. Pat. No. 5,552,977, issued Sep. 3, 1996, to Xu et al., and entitled "THREE PHASE INVERTER CIRCUIT WITH IMPROVED TRANSITION FROM SVPWM TO SIX STEP OPERATION"; U.S. Pat. No. 5,627,446, issued May 6, 1997, to Deng et al., and entitled "INDUCTION MOTOR CONTROL METHOD"; U.S. Pat. No. 5,739,664, issued Apr. 14, 1998, to Deng et al., and entitled "INDUCTION MOTOR DRIVE CONTROLLER"; U.S. Pat. No. 5,821,720, issued Oct. 13, 1998, to Deng et al., and entitled "BACKLASH ELIMINATION IN THE DRIVETRAIN OF AN ELECTRIC VEHICLE"; U.S. Pat. No. 6,072,297, issued Jun. 6, 2000, to Xu et al., and entitled "VIBRATION DETECTION AND CONTROL FOR A VEHICLE DRIVETRAIN"; U.S. Pat. No. 6,047,787, issued Apr. 11, 2000, to Deng et al., and entitled "VOLTAGE CONTROL METHOD FOR AN ELECTRIC MOTOR CONTROL SYSTEM"; U.S. Pat. No. 5,905,349, issued May 18, 1999, to Farkas et al., and entitled "METHOD OF CONTROLLING ELECTRIC MOTOR TORQUE IN AN ELECTRIC VEHICLE"; U.S. Pat. No. 6,122,588, issued Sep. 19, 2000, to Shehan et al., and entitled "VEHICLE SPEED CONTROL WITH CONTINUOUSLY VARIABLE BRAKING TORQUE"; U.S. Pat. No. 6,377,019, issued Apr. 23, 2002, to Chen, and entitled "PEAK TORQUE PER AMPERE METHOD FOR INDUCTION MOTOR VECTOR CONTROL"; U.S. Pat. No. 6,239,575, issued May 29, 2001, to Xu et al., and entitled "INDUCTION MOTOR POWER/TORQUE CLAMPING FOR ELECTRIC VECHILE PERFORMANCE"; U.S. Pat. No. 6,327,524, issued Dec. 4, 2001, to Chen, and entitled "SYSTEM FOR HIGH EFFICIENCY MOTOR CONTROL"; U.S. Pat. No. 6,366,049, issued Apr. 2, 2002, to Chen et al., and entitled "MOTOR STARTER AND SPEED CONTROLLER SYSTEM"; U.S. Pat. No. 6,212,085, issued Apr. 3, 2001, to West, and entitled "INTEGRATED DUAL VOLTAGE SOURCED INVERTER"; U.S. Pat. No. 6,388,419, issued May 15, 2002, to Chen et al., and entitled "MOTOR CONTROL SYSTEM"; U.S. Pat. No. 6,452,352, issued Sep. 17, 2002, to Farkas, and entitled "METHOD OF CURRENT INTERACTION IN AN ELECTRIC MOTOR DRIVE SYSTEM HAVING A LOAD-DEPENDENT CURRENT GENERATING SYSTEM"; U.S. Pat. No. 6,603,672, issued Aug. 5, 2003, to Deng et al., and entitled "POWER CONVERTER SYSTEM"; U.S. Pat. No. 6,700,342, issued Mar. 2, 2004, to Hampo et al., and entitled "METHOD AND APPARATUS FOR HIGH PERFORMANCE PERMANENT MAGNET MOTOR SPEED CONTROL WITH LIMITED POSITION INFORMATION"; U.S. Pat. No. 6,631,960, issued Oct. 14, 2003, to Grand et al., and entitled "SERIES REGENERATIVE BRAKING TORQUE CONTROL SYSTEMS AND METHODS"; U.S. Pat. No. 6,630,809, issued Oct. 7, 2003, to Chen et al., and entitled "SYSTEM AND METHOD FOR INDUCTION MOTOR CONTROL"; U.S. Pat. No. 6,707,270, issued Mar. 16, 2004, to Chen et al., and entitled "SYSTEM AND METHOD FOR INDUCTION MOTOR CONTROL"; and U.S. Pat. No. 5,994,859, issued, to Deng et al., and entitled "TORSIONAL OSCILLATION COMPENSATION IN THE DRIVETRAIN OF A MOTOR VEHICLE"; and U.S. application Ser. No. 10/453,920, filed Jun. 2, 2003, and entitled "POWER CONVERTER SYSTEM"; Ser. No. 10/293,911, filed Nov. 12, 2002, and entitled "SYSTEMS AND METHODS FOR ELECTRIC MOTOR CONTROL"; Ser. No. 10/346,724, filed Jan. 16, 2003, and entitled "CIRCUIT CONFIGURATION FOR PERMANENT MAGNET SYNCHRONOUS MOTOR CONTROL"; Ser. No. 10/345,872, filed Jan. 15, 2003, and entitled OVERMODULATION SYSTEMS AND METHODS FOR INDUCTION MOTOR CONTROL"; Ser. No. 10/346,554, filed Jan. 16, 2003, and entitled "APPARATUS AND METHOD TO ACHIEVE MULTIPLE EFFECTIVE RATIOS FROM A FIXED RATIO TRANSAXLE"; Ser. No. 10/449,824, filed May 30, 2003, and entitled "METHOD AND APPARATUS FOR MOTOR CONTROL"; and Ser. No. 10/622,845, filed Jul. 18, 2003, and entitled "APPARATUS AND METHOD EMPLOYING BI-DIRECTIONAL CONVERTER FOR CHARGING AND/OR SUPPLYING POWER"; are incorporated herein by reference, in their entirety. Aspects of the invention can be modified, if necessary, to employ systems, circuits and concepts of the various patents, applications and publications to provide yet further embodiments of the present apparatus, methods and articles.

These and other changes can be made to the described embodiments in light of the above-detailed description. In general, in the following claims, the terms used should not be construed as limited to the specific embodiments disclosed in the specification and the claims, but should be construed to include all drivetrains that operate in accordance with the claims. Accordingly, the invention is not limited by the disclosure, but instead its scope is to be determined entirely by the following claims.

The invention claimed is:

1. A method of vibration compensation, the method comprising:
    applying a hardware limitation to a torque command to produce a torque request; converting the torque request to a torque current value;
    determining a peak of vibration;
    applying an adaptation degree value to the torque current value to produce a torque current request value wherein the adaptation degree value compensates for vibrations and is based at least in part on the determined peak of vibration;
    applying an electrical limitation to the torque current request value to produce a torque current reference value;
    subtracting a torque current peak compensation value from the torque current reference value, wherein the torque current peak compensation value is based at least in part on the determined peak of vibration;
    subtracting a torque current compensation value from the results of the subtraction of the torque current peak compensation value from the torque current reference value to produce an adjusted torque current reference value;
    pulse width modulating the adjusted torque current reference value to produce pulse width modulated signals; and
    providing the pulse width modulated signals to drive a power converter.

2. The method of claim 1 wherein determining a peak of vibration comprises:
    setting a torque current compensation maximum value equal to the torque current compensation value if the torque current compensation value is greater than the torque current compensation maximum value; and setting a torque current compensation minimum value equal to the torque current compensation value if the torque current compensation value is less than the torque current compensation minimum value.

3. The method of claim 2 wherein determining a peak of vibration further comprises: if the torque current compensation value is not greater than the torque current compensation maximum value and if the torque current compensation value is not less than the torque current compensation minimum value, setting the torque current compensation maximum value equal to the product of the torque current compensation value and a multiplicand between zero and one; and setting the torque current compensation minimum value equal to the torque current compensation value if the torque current compensation value is less than the torque current compensation minimum value.

4. The method of claim 3 wherein determining a peak of vibration further comprises: determining if a compensation function is disabled; and if the compensation function is disabled, setting the torque current compensation maximum value equal to zero; and setting the torque current compensation minimum value equal to zero.

5. The method of claim 1, further comprising: setting a present peak value equal to an absolute value of a present torque current compensation value if the present torque current compensation value is greater than a previous peak value.

6. The method of claim 5, farther comprising: setting the present peak value equal to a summation of the previous peak value minus a product of a constant and the previous peak value wherein the constant is between zero and one.

7. The method of claim 6 wherein the constant is approximately 0.995.

8. A system for controlling an alternating current machine, the system comprising:
    a torque to current conversion module configured to generate a torque current signal in response to a torque command signal;
    a pulse width modulation module configured to receive a reference signal and to produce a pulse width modulated signal;
    a vibration compensation module configured to generate a torque current compensation signal, a torque current peak compensation signal and an adaptation degree signal to compensate for vibrations based at least in part on a vibration signal, wherein the system is configured to produce the reference signal based at least in part on the torque current signal, the torque current compensation signal, the torque current peak compensation signal and the adaptation degree signal; and
    a multiplier configured to multiply the torque current signal by the adaptation degree signal and to produce a multiplier output signal; an electrical limitation module configured to receive the multiplier output signal and to produce an electrical limitation output signal; a first summer configured to subtract the torque current peak compensation signal from the electrical limitation output signal and to produce a first summer output signal; and a second summer configured to subtract the torque current compensation signal from the first summer output signal and to produce the reference signal.

9. The system of claim 8, further comprising: a hardware limitation module coupled to the torque to current conversion module and configured to produce the torque command signal.

10. A system for controlling an alternating current machine, comprising:
    means for converting a torque request to a torque current signal;
    means for generating a torque current peak compensation signal;
    means for adjusting the torque current signal coupled to the means for generating a torque current peak compensation signal and the means for converting a torque request to a torque current signal; and
    means for generating a pulse width modulated signal coupled to the means for adjusting torque current signal, wherein the means for adjusting the torque current signal comprises means for applying an electrical limitation and the means for generating a torque current peak compensation signal is configured to generate a torque current compensation signal, an adaptation degree signal, and a torque current peak compensation signal, wherein the means for adjusting the torque current signal is configured to: multiply the torque current signal by the adaptation degree signal, generating a first adjusted signal; apply the electrical limitation to the first adjusted signal, producing a second adjusted signal; subtract the torque current peak compensation signal from the second adjusted signal, producing a third adjusted signal; and subtract the torque current compensation signal from the third adjusted signal.

11. The system of claim 10 wherein the means for generating a torque current peak compensation signal comprises means for implicitly dividing two numbers.

* * * * *